(12) United States Patent
Matsumoto et al.

(10) Patent No.: US 6,354,515 B1
(45) Date of Patent: Mar. 12, 2002

(54) WASHER NOZZLE DEVICE FOR VEHICLES

(75) Inventors: Yasuhiro Matsumoto, Hamamatsu; Naoki Tamano, Nagoya, both of (JP)

(73) Assignees: Asmo Co., Ltd., Shizuoka; Tamanokasei Co., Ltd., Aichi-Ken, both of (JP)

( * ) Notice: Subject to any disclaimer, the term of this patent is extended or adjusted under 35 U.S.C. 154(b) by 0 days.

(21) Appl. No.: 09/598,724

(22) Filed: Jun. 21, 2000

(30) Foreign Application Priority Data

Jun. 25, 1999  (JP) .......................................... 11-179974

(51) Int. Cl.[7] .................................................. B05B 1/10
(52) U.S. Cl. .................... 239/284.1; 239/552; 239/553; 239/587.4
(58) Field of Search ............................ 239/284.1, 284.2, 239/504, 552, 553, 553.5, 587.1, 587.4, 590, 590.5

(56) References Cited

U.S. PATENT DOCUMENTS

| | | | | |
|---|---|---|---|---|
| 2,289,650 A | * | 7/1942 | Horton | 239/587.4 X |
| 2,703,259 A | * | 3/1955 | Neufeld | 239/578.4 X |
| 3,067,955 A | * | 12/1962 | Heath | 239/284.1 X |
| 3,433,416 A | * | 3/1969 | Bauer et al. | 239/587.4 X |
| 5,163,619 A | * | 11/1992 | Wada | 239/284.1 |
| 5,975,431 A | * | 11/1999 | Harita et al. | 239/284.1 X |
| 6,062,491 A | * | 5/2000 | Hahn et al. | 239/284.1 X |

FOREIGN PATENT DOCUMENTS

| | | | | |
|---|---|---|---|---|
| JP | 55-159753 | 11/1980 | | B05B/1/10 |
| JP | 58-183255 | 12/1983 | | B05B/1/14 |
| JP | 1-109471 | 7/1989 | | B60S/1/52 |

* cited by examiner

*Primary Examiner*—Steven J. Ganey
(74) *Attorney, Agent, or Firm*—Synnestvedt & Lechner LLP

(57) ABSTRACT

A vehicle washer nozzle device in which a nozzle is easily installed in a body and the injection direction can be three-dimensionally adjusted. The nozzle is fitted in the body. A passage passes through the nozzle. A partition defines four injection ports in the passage. The partition includes a generally triangular guide, which increases in dimension toward the injection ports, and a horizontal partition, which intersects the triangular guide. Two inclined guide surfaces of the guide guide the flow of cleaning liquid. The location of the maximum dimension of the triangular guide is located inward of the imaginary projection of the passage.

14 Claims, 8 Drawing Sheets

WASHER NOZZLE DEVICE FOR VEHICLES

BACKGROUND OF THE INVENTION

The present invention relates to a washer nozzle device that injects cleaning liquid to a washed surface such as a windshield of automobiles.

Typically, vehicles include washer nozzle devices located near the windshield. The washer nozzle device sprays cleaning liquid on the windshield for wiping by the wiper blades. Typically, the washer nozzle device includes a body and a nozzle. The body is attached to the hood of a vehicle, and the nozzle is fitted in a recess of the body. A liquid passage is formed in the body, and an injection passage is formed in the nozzle. The nozzle is installed in the body such that the injection passage is connected to the liquid passage. A typical nozzle has only one injection port. When the number of the injection ports is one, injected cleaning liquid lands on one point of the windshield. Therefore, cleaning liquid is not delivered to a wide area of the glass surface, which reduces the efficiency of cleaning the glass.

To solve the above problem, a multiple-point-injection washer nozzle device has been proposed. As shown in FIG. 14, three nozzles 51 are fitted in three sockets 52a of the body 52.

However, in the washer nozzle device of FIG. 14, it is troublesome to install the plurality of nozzles 51 in the body 52 and to adjust the injection direction of each nozzle 51. Also, the plurality of sockets 52a increase the size of the body 52.

Japanese Unexamined Utility Model Publication No. 58-183255, No. 1-109471, and No. 55-159753 describe multiple-point-injection washer nozzle devices in which one nozzle having a plurality of injection ports is installed in a body.

For example, as shown in FIG. 15A, the washer nozzle device of Publication No. 58-183255 includes a body 61 and a nozzle 62, which is fitted in the body 61. As shown in FIG. 15B, the nozzle 62 includes three radial holes 63, which enable multiple-streams. The upper and lower surfaces of the nozzle 62 are cylindrical, which permits the nozzle 62 to pivot, and the injection direction can be adjusted vertically. The nozzle is formed by coupling an upper part 62a and a lower part 62b.

However, the nozzle 62 can be adjusted only vertically, and the injection direction of the streams cannot be adjusted three-dimensionally. Also, the nozzle 62 is formed by two parts 62a, 62b, which increases the number of assembly steps.

The step of coupling two parts can be omitted by drilling the nozzle holes in a single nozzle. However, this necessitates the drilling step, and the number of manufacturing steps is not reduced. It is also possible to form the nozzle holes by molding the nozzle. However, since the nozzle holes 71a are shaped as shown in FIG. 16, slide molds 72 are necessary to form the nozzle holes 71a. The slide molds 72 have to be moved diagonally relative to the other mold parts. Therefore, the molding apparatus is complicated, which reduces the manufacturing efficiency and increases the manufacturing costs.

SUMMARY OF THE INVENTION

A first objective of the present invention is to provide a multiple-stream washer nozzle device in which a nozzle is easily molded.

A second objective of the present invention is to provide a multiple-stream washer nozzle device in which a nozzle is easily installed in a body and the injection direction is easily adjusted.

A third objective of the present invention is to provide a multiple-stream washer nozzle device in which the injection direction can be three-dimensionally adjusted.

In accordance with the present invention, there is provided a washer nozzle device for a vehicle comprising:

a body including a fluid path and a generally spherical socket, wherein the body is attachable to the vehicle; and an adjustable nozzle including a flow passage and a generally spherical portion for engaging the socket, wherein a downstream end of the flow passage is located at an injection port, wherein the nozzle is attached to the body such that the flow passage communicates with the fluid path, wherein the nozzle includes a partition member located in the flow passage to divide a flow of fluid into a plurality of streams.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

A first embodiment of the present invention will now be described with reference to FIGS. 1–11.

Figure 11:
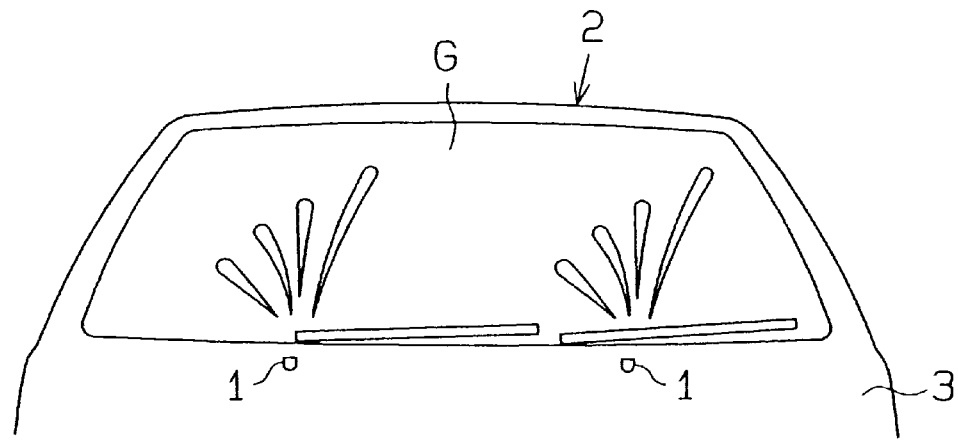
FIG. 11 is a partial front view of an automobile.

As shown in FIG. 11, two washer nozzle devices are attached to right and left positions on a hood 3 of a vehicle 2. Therefore, cleaning liquid is sprayed to both right and left areas of a windshield G.

Figure 10:
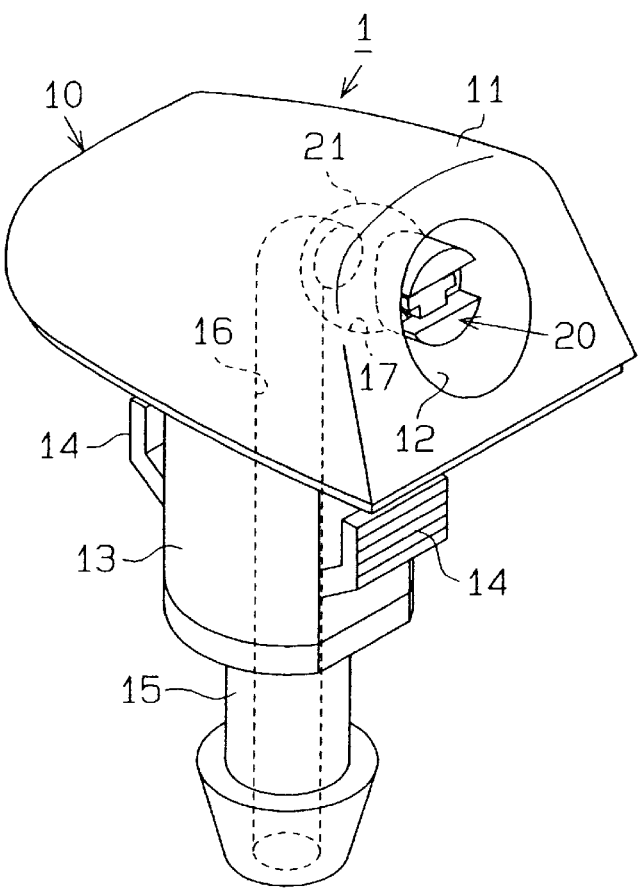
FIG. 10 is a perspective view of the washer nozzle device.

Since the nozzle devices 1 are identical, only one washer nozzle device 1 will be described below. As shown in FIG. 10, the washer nozzle device 1 includes a body 10 and a nozzle 20, which are made of resin. An engagement hole 12 is formed in a front surface of the head 11 of the body 10. The nozzle 20 is press-fitted into the engagement hole 12. The body 10 includes a middle portion 13, a pair of hooks 14, which are formed on the front and rear of the middle portion, and a tubular portion 15, which extends downward from the middle portion 13. When the middle portion is installed in a hole (not shown), which is formed in the hood 3, the hooks 14 prevent the body 10 from escaping from the hole. A liquid passage 16 is formed in the body 10. The liquid passage 16 extends from the lower end of the tubular portion 15 to the engagement hole 12. The tubular portion 15 is connected to a washer tank (not shown) of the vehicle 2 through a pipe (not shown).

Figure 9:
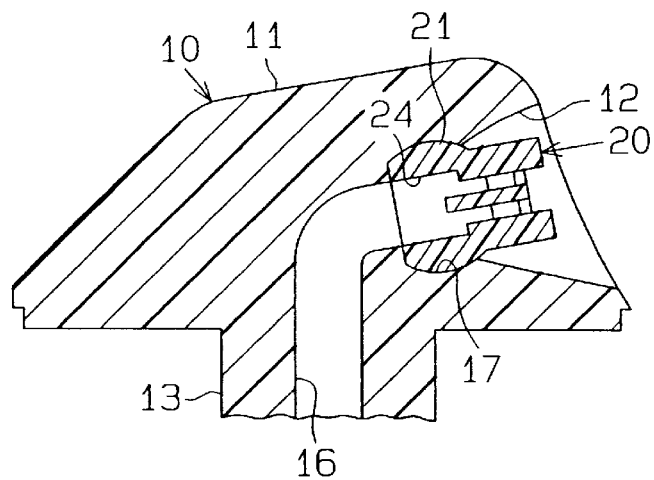
FIG. 9 is a partial cross-sectional view of a washer nozzle device.

As shown in FIGS. 9 and 10, the engagement hole includes a spherical socket 17. The nozzle 20 includes a spherical portion 21. The spherical portion 21 of the nozzle 20 engages the socket 17 of the engagement hole 12. Therefore, the spherical portion 21 rotates in the socket 17, and the position of the nozzle 20 relative to the body can be three-dimensionally varied.

Figure 1:
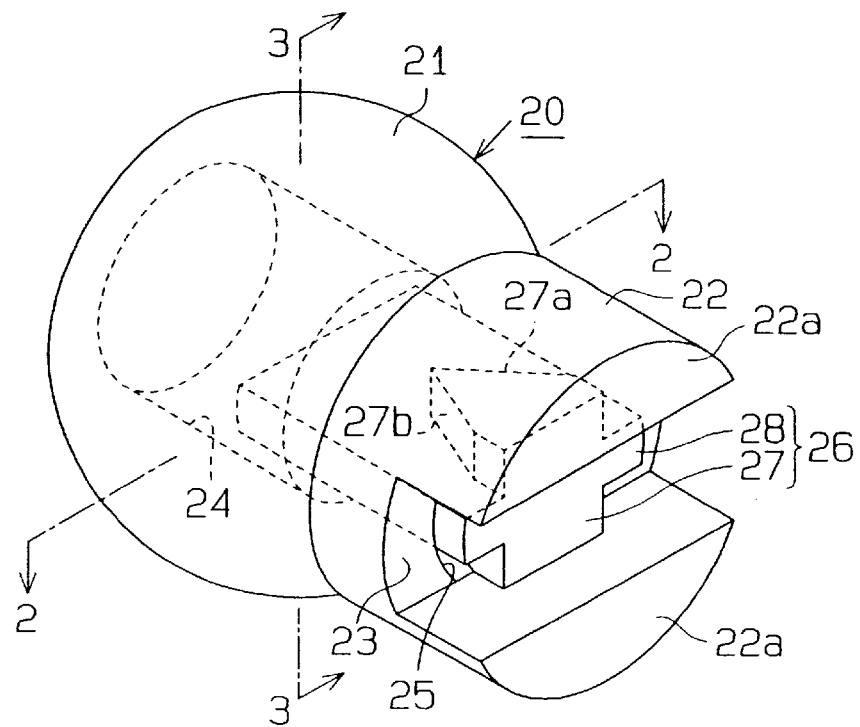
FIG. 1 is a perspective view of a nozzle of a first embodiment according to the present embodiment.
Figure 2:
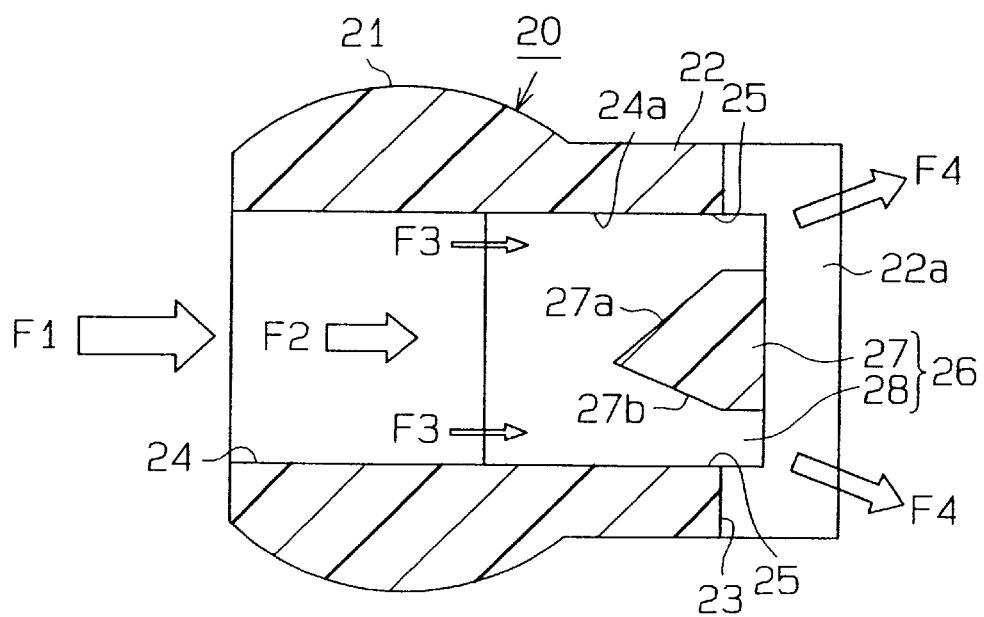
FIG. 2 is a cross-sectional view taken along the line 2—2 of FIG. 1.
Figure 3:
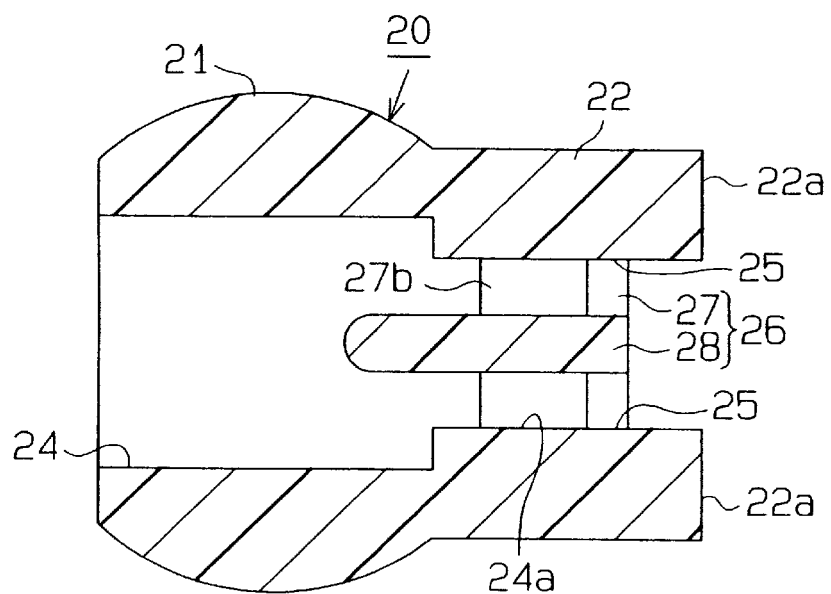
FIG. 3 is a cross-sectional view taken along the line 3—3 of FIG. 1.
Figure 4:
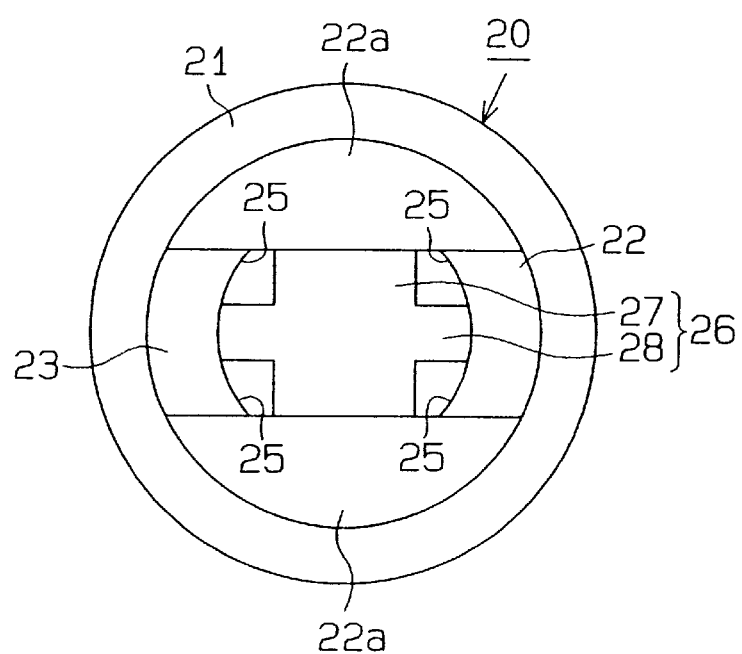
FIG. 4 is a front view of FIG. 1.

The structure of the nozzle 20 will now be described with reference to FIGS. 1–5. FIG. 1 is a perspective view of the nozzle 20. FIG. 2 is a cross-sectional view taken along the line 2—2 of FIG. 1. FIG. 3 is a cross-sectional view taken along the line 3—3 of FIG. 1. FIG. 4 is a front view of the nozzle 20.

The nozzle 20 includes an outlet 22, which extends from the front spherical portion 21. The outlet 22 includes a pair of semi-cylindrical portions 22a. A passage 24 is formed between the rear surface of the spherical portion 21 and the bottom of a groove 23. The passage 24 is connected to the liquid passage 16 when the nozzle 20 is fitted in the socket 17 (see FIG. 9).

The front part of the passage 24 and the rear part of the passage 24 have different cross-sectional shapes. The rear part of the passage 24, which corresponds to the spherical portion 21, has a circular cross-sectional shape. The front part of the passage, which corresponds to the outlet 22, has a cross-sectional shape that includes two opposed, flat sides and two opposed curved sides. The front part of the passage 24 serves as an injection passage 24a.

Four injection ports 25 are formed in the bottom of the groove 23. A partition 26, the front view of which is cross-shaped, divides the injection passage 24a into the four injection ports 25. The partition 26 extends forward from the bottom surface of the groove 23.

The partition 26 includes a vertical guide 27 and a horizontal guide, or separator 28. The vertical guide 27 is located in the injection passage 24a and has a generally triangular top plan view as shown in FIG. 1. The side walls of the guide 27, that is, vertical guide surfaces 27a, 27b, are inclined as shown in FIG. 2 and guide cleaning liquid to the injection ports 25. Accordingly, cleaning liquid is divided in the passage 24 and is injected in proper directions by the guide 27. The inclination angle of the left vertical guide surface 27a is different from that of the right vertical guide surface 27b so that cleaning liquid is injected in desirable directions. The horizontal guide 28, which is rectangular and parallel to the injection passage 24a, is arranged in the center of the injection passage 24a to separate the injection passage 24a into upper and lower passages. In FIG. 3, the spherical portion 21 is cut at its center, but the outlet 22 is cut at a position that is offset (leftward in FIG. 4) from its center.

Figure 5:
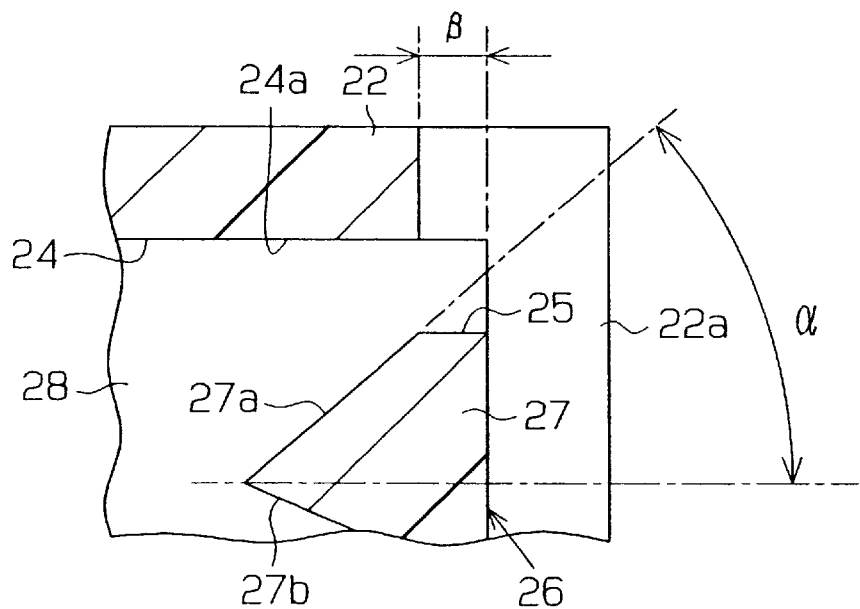
FIG. 5 is an enlarged partial cross-sectional view of the nozzle showing the vicinity of the injection ports.

As shown in FIG. 5, the inclination angle α of the left vertical guide surface 27a of the guide is set to an angle that is twice the desirable injection angle. As shown in FIG. 2, when a flow F1 enters the passage 24, it is divided into a fast central flow F2 and a slow peripheral flow F3. The fast flow F2 strikes the vertical guide 27 and flows out along the vertical guide surfaces 27a, 27b. When flowing out, the fast flow F2 is affected by the slow flow F3, which makes the injection angle half the inclination angle α (the direction shown by F4). The actual injection angle is also half the inclination angle of the right vertical guide surface 27b.

As shown in FIG. 5, the vertical guide 27 projects forward of the bottom of the groove 23 by a distance β. Adjusting the depth of the groove 23 adjusts the length of the injection passage 24a and the distance β. The injection angle is optimized by adjusting the distance β.

Figure 6:
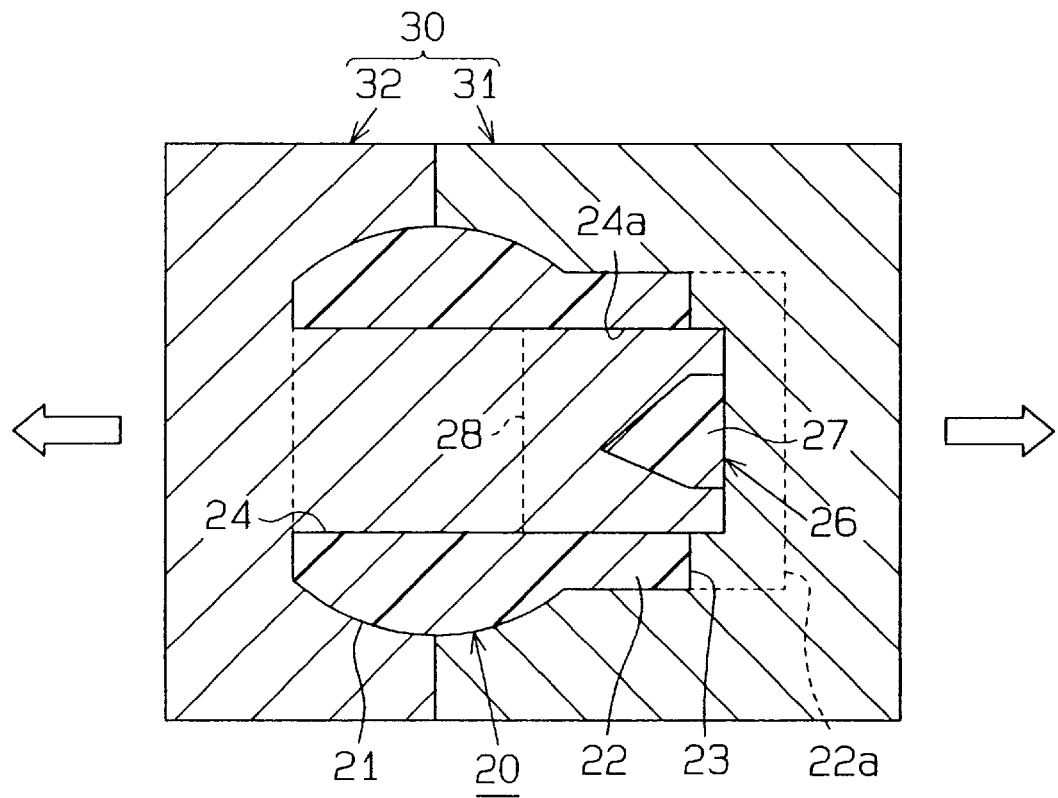
FIG. 6 is a cross-sectional view illustrating a method of molding the nozzle.
Figure 16:
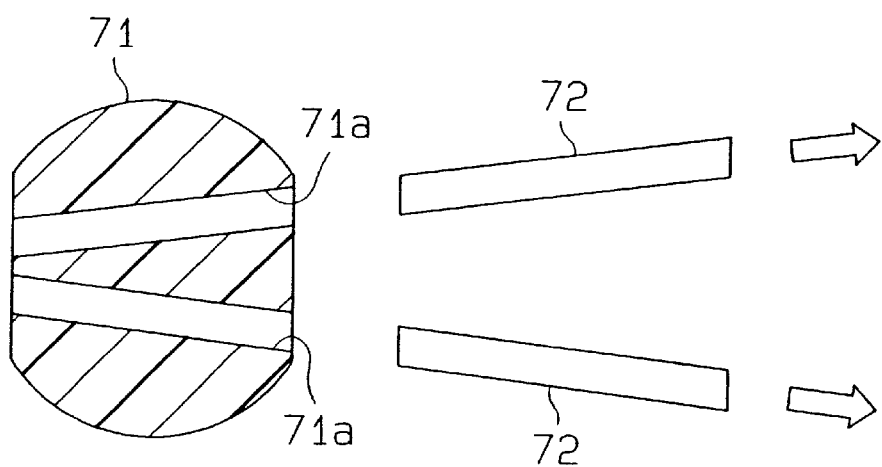
FIG. 16 is a cross-sectional view illustrating another prior art nozzle.

FIG. 6 shows a method for molding the nozzle 20. The vertical guide 27 of the partition 26 is tapered to increase in size toward the injection ports 25. However, the vertical guide 27 is located inward of the imaginary projection of the injection passage 24a even at the largest portion of the vertical guide 27. Therefore, the nozzle 20 including the partition 26 can be molded by a two-part mold 30 without using the slide mold of FIG. 16. As shown in FIG. 6, the mold 30 includes a front mold 31 and a rear mold 32. The front and rear molds 31, 32 contact one another at the top of the spherical portion 21 outside the nozzle 20 and at the front surface of the partition 26 inside the nozzle 20.

Figure 7:
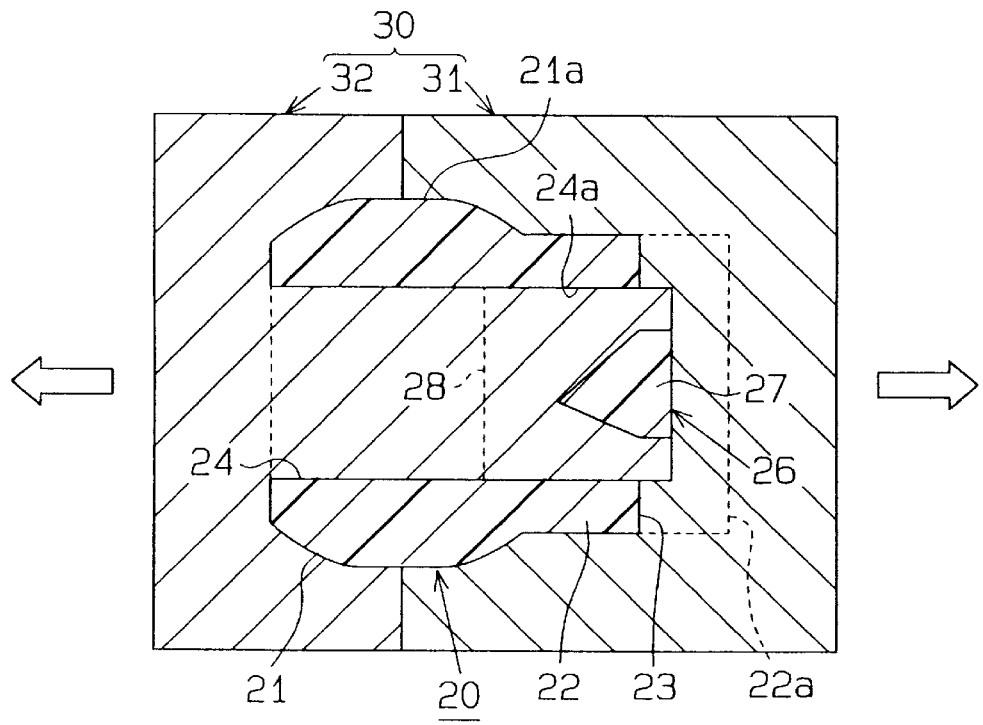
FIG. 7 is a cross-sectional view illustrating another method of molding the nozzle.

As shown in FIG. 7, a cylindrical portion 21a may be formed on the spherical portion 21. The front mold 31 and the rear mold 32 may contact one another at the cylindrical portion 21a. The interface of the front and rear molds 31, 32 produces a seam on the top of the spherical portion 21. The seam prevents smooth installation of the nozzle 20 and hinders adjusting the position of the nozzle 20 in the body 10. The cylindrical portion 21a of FIG. 7 solves this problem.

Figure 8:
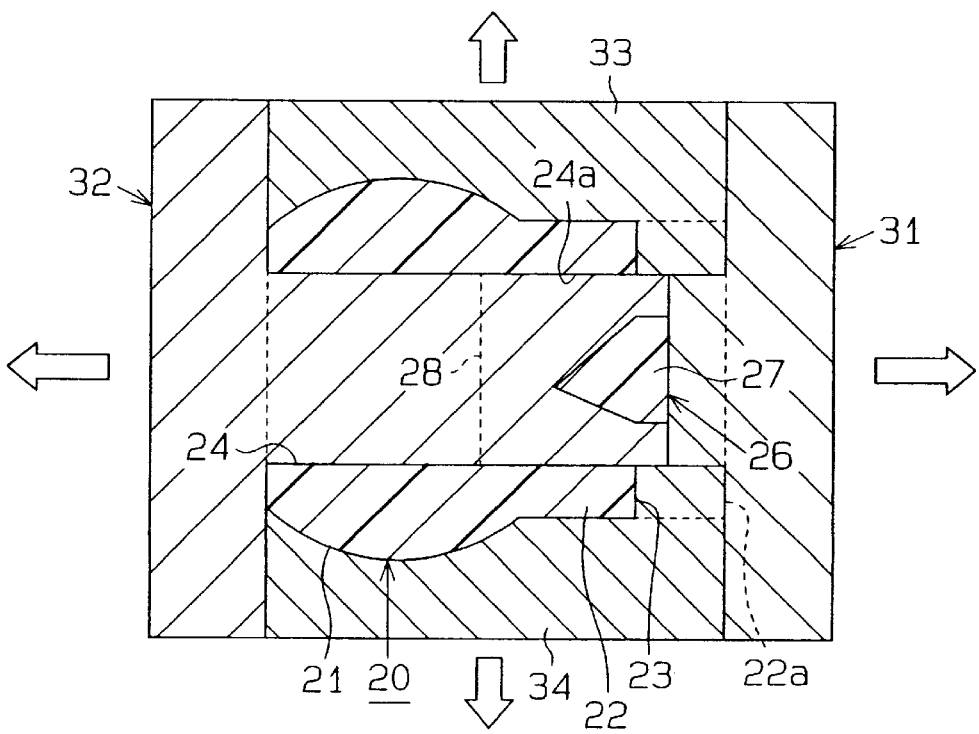
FIG. 8 is a cross-sectional view illustrating another method of molding the nozzle.

Further, as shown in FIG. 8, the spherical portion 21 may be formed using upper and lower molds 33, 34. This prevents the seam from being formed on the spherical portion 21. Accordingly, the nozzle 20 can be smoothly installed to the body 10.

The operation of the washer nozzle device 1 including the nozzle 20 will now be described.

The nozzle 20 is press-fitted into the engagement hole 12 to make the washer nozzle device 1. Then, the injection direction is determined by adjusting the position of the nozzle 20. The position of the nozzle 20 can be three-dimensionally adjusted. Therefore, the injection direction can be optimized.

As shown in FIG. 2, the flow F1 of cleaning liquid from the liquid passage 16 to the passage 24 is divided into the central fast flow F2 and the peripheral slow flow F3. The vertical guide 27 divides the fast flow F2 along the right and left guide surfaces 27a, 27b. The fast flow F2 is affected by the slow flow F3, and the angle of the injection direction of the cleaning liquid is half the inclination angle α. Accordingly, as shown in FIG. 11, cleaning liquid is injected in four different directions from the four injection ports 25. Therefore, cleaning liquid lands on the windshield G at four points. Since the distance β is adjusted, the four injection directions are optimized. In this way, one nozzle 20 injects cleaning liquid in four directions. This improves the efficiency of cleaning the windshield G.

The nozzle is formed by resin molding by the mold 30, which is not a slide mold. The structure of the mold 30 is relatively simple, which improves the efficiency of manufacturing.

The present embodiment has the following advantages.

(1) Four stream injection is achieved by installing one nozzle 20 in the body 10. Therefore, the number of parts is reduced, and the washer nozzle device 1 is compact. The spherical portion 21 of the nozzle 20 is fitted in the socket 17 of the body 10, and the position of the nozzle can be three-dimensionally adjusted.

(2) The lateral dimension of the vertical guide portion 27 increases toward the injection ports 25. However, the location of the maximum dimension of the vertical guide 27 is inward of the imaginary projection of the injection passage 24a. Accordingly, the nozzle 20 can be molded by a two-part mold 30 without a slide mold. This simplifies the mold 30 and increases the efficiency of manufacturing the nozzle 20, which reduces the manufacturing costs.

The present invention can further be embodied as follows.

Figure 12:
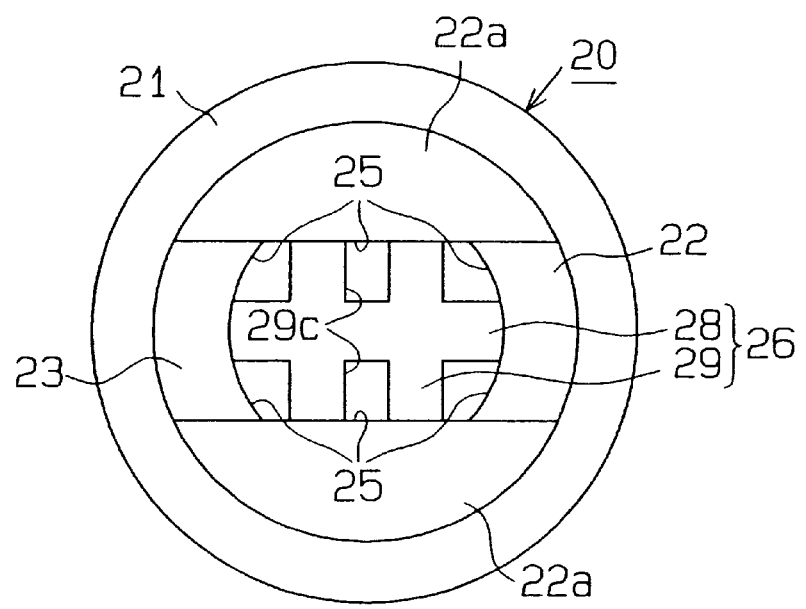
FIG. 12 is a front view of a nozzle according to another embodiment of the present invention.
Figure 13:
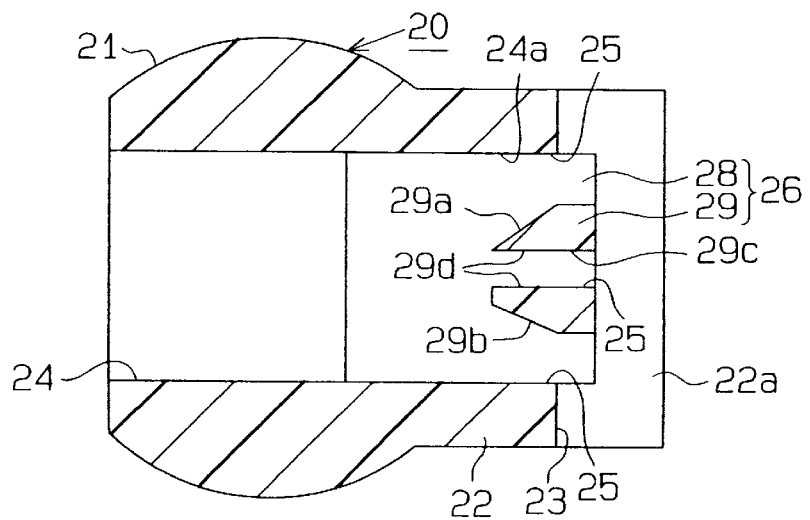
FIG. 13 is a cross-sectional view of the nozzle of FIG. 12.
Figure 14:
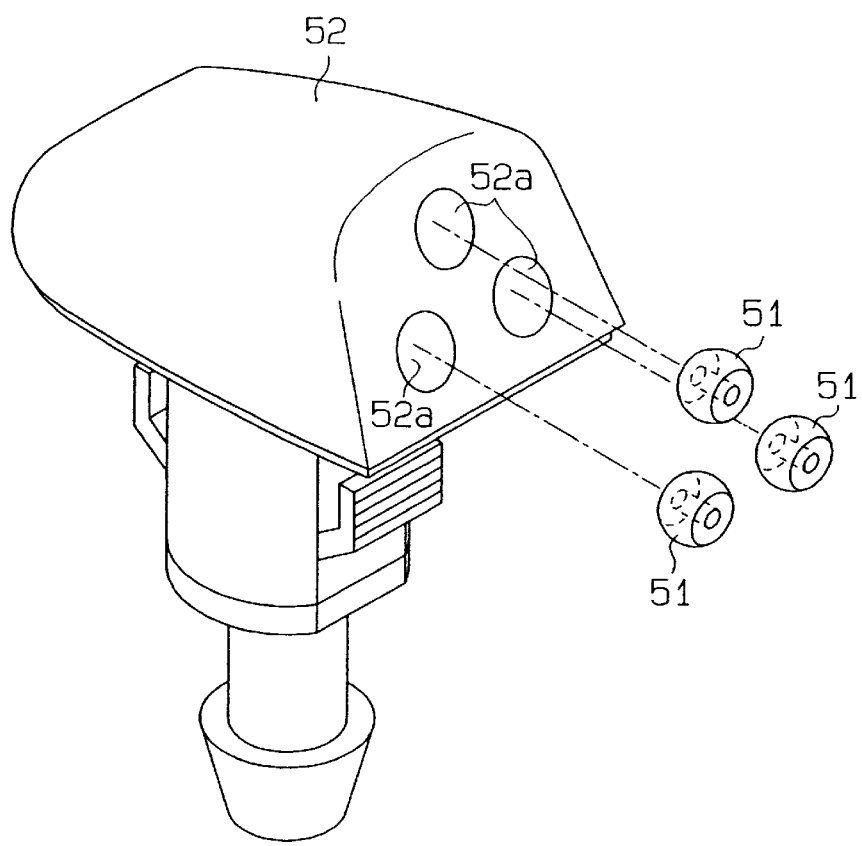
FIG. 14 is an exploded perspective view showing a prior art multiple-points-injection washer nozzle device.
Figure 15A:
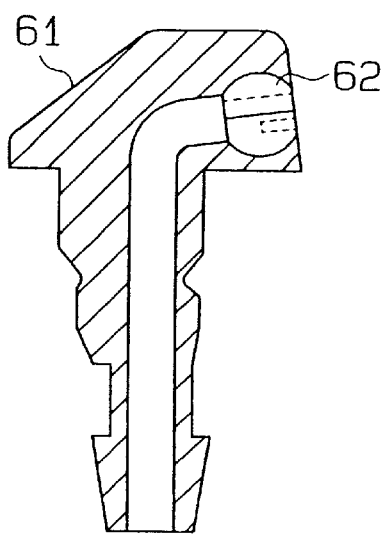
FIG. 15A is a cross-sectional view showing a prior art multiple-stream washer nozzle device.
Figure 15B:
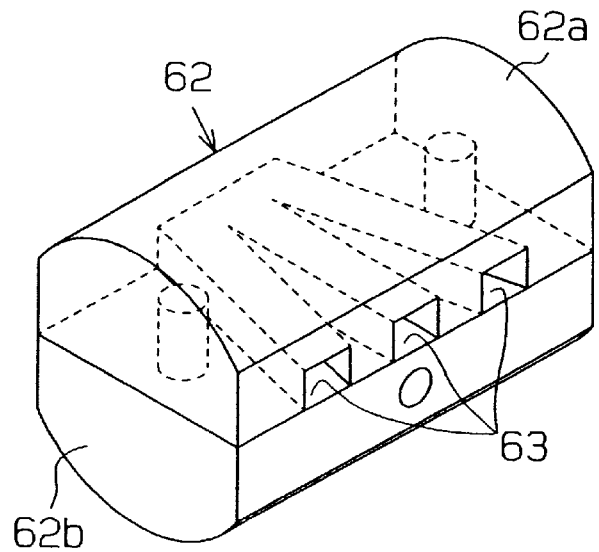
FIG. 15B is a perspective view showing a nozzle of a prior art washer nozzle device of FIG. 15A.

The number of the injection ports 25 of the nozzle 20 is not limited to four. As shown in FIGS. 12 and 13, there may be six ports. In detail, the injection passage 24a is partitioned into three parts in a horizontal direction by a vertical guide 29 and is partitioned into upper and lower parts by a horizontal partition 28. The vertical guide 29 includes two inclined guide surfaces 29a, 29b. The guide 29 also includes central passages 29c, which pass through the center of the guide 29. The walls of the passages 29c form guide surfaces 29d. The central passages have a fixed width and extend in a straight frontward direction, which enables the nozzle 20 to be molded without a slide mold. The passages 29c can have any shape as long as they can be formed without a slide mold. For example, the passages may be formed such that their inner dimensions increase either frontward or rearward.

This embodiment also has the advantage (1) of the first embodiment. Since six injection streams are achieved by one nozzle 20, the efficiency of wiping the windshield G is increased without increasing the size of the washer nozzle device 1. Also, since the vertical guide 29 is located inward of the injection passage 24a and the passage 29c is straight, the nozzle 20 can be molded without a slide mold. Accordingly, the nozzle device of this embodiment also has the advantage (2) of the first embodiment.

In the first embodiment, one of the two guide surfaces does not have to be inclined. The two guide surfaces can still direct cleaning liquid in two directions.

The passage 24 is not limited to one that is straight. The passage 24 can have any shape as long as it can be properly molded. For example, the passage 24 may be tapered toward the injection port of the passage 24.

In the first and second embodiments, the injection port is partitioned into upper and lower spaces by the horizontal partition 28. However, the partition may be omitted. The injection port may be vertically partitioned into three or more spaces.

To vary the vertical injection direction of the streams, at least one of the upper and lower surfaces of the partition 28 may be inclined. That is, the guide extends horizontally, but it may incline. In this structure, the nozzle is molded without a slide mold as long as the location of the maximum dimension of the partition 28 is located inward of the imaginary projection of the passage 24a.

The number of injection ports in each partitioned space may be arbitrarily determined. When there are more than two steps, the number of the injection ports in each step may be different.

A plurality of nozzles 20 may be installed in the body 10. In this case, the washer nozzle device can inject more streams of cleaning liquid (the number of injection ports of a nozzle multiplied by the number of nozzles).

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A washer nozzle device for a vehicle comprising:
   a body including a fluid path and a generally spherical socket, wherein the body is attachable to the vehicle; and
   an adjustable nozzle including a flow passage and a generally spherical portion for engaging the socket, wherein a downstream end of the flow passage is located at an injection port, wherein the nozzle is attached to the body such that the flow passage communicates with the fluid path, wherein the nozzle includes a partition member located in the flow passage to divide a flow of fluid into a plurality of streams;
   wherein the partition member includes a fluid guide located in the center of the flow passage, the fluid guide having a dimension that increases in the downstream direction.

2. A washer nozzle device for a vehicle according to claim 1, wherein the fluid guide has a guide surface that is inclined with respect to the center axis of the nozzle.

3. A washer nozzle device for a vehicle according to claim 1, wherein the guide surface is one of a pair of guide surfaces, wherein each guide surface of the pair has a different inclination with respect to the center axis.

4. A washer nozzle device for a vehicle according to claim 1, wherein the partition member includes at least one separator joined to the fluid guide.

5. A washer nozzle device for a vehicle according to claim 4, wherein the injection port is partitioned in a first direction by the fluid guide and is partitioned in a second direction by the separator, wherein the first direction is perpendicular to the second direction.

6. A washer nozzle device for a vehicle according to claim 1, wherein a portion of the partition member projects from a surface defining an outlet opening of the nozzle in the downstream direction.

7. A washer nozzle device for a vehicle according to claim 6, wherein the partition member is located inside an imaginary projection of the flow passage.

8. A washer nozzle device for a vehicle according to claim 1, wherein the nozzle has an outlet portion extending radially from the spherical portion.

9. A washer nozzle device for a vehicle according to claim 8, wherein the flow passage has a circular cross-sectional shape inside the spherical portion, and the cross-sectional shape of the flow passage in the outlet portion has two opposed flat sides and two opposed curved sides.

10. A washer nozzle device for a vehicle comprising:
    a body including a fluid path and a generally spherical socket, wherein the body is attachable to the vehicle; and
    an adjustable nozzle including a flow passage and a generally spherical portion for engaging the socket, wherein a downstream end of the flow passage is located at an injection port, wherein the nozzle is attached to the body such that the flow passage communicates with the fluid path, wherein the nozzle includes:
- an outlet portion extending radially from the spherical portion, wherein the flow passage has a circular cross-sectional shape inside the spherical portion, and the cross-sectional shape of the flow passage in the outlet portion has two opposed flat sides and two opposed curved sides; and
- a partition member located in the flow passage to divide a flow of fluid into a plurality of streams, wherein a portion of the partition member projects from a surface defining an outlet opening of the nozzle in the downstream direction, wherein the portion is located inside an imaginary projection of the flow passage, wherein the partition member includes;
  - a fluid guide located in the center of the flow passage, the fluid guide having a dimension that increases in the downstream direction, and
  - at least one separator joined with the fluid guide.

11. A washer nozzle device for a vehicle according to claim 10, wherein the fluid guide has a guide surface that is inclined with respect to the center axis of the nozzle.

12. A washer nozzle device for a vehicle according to claim 10, wherein the guide surface is one of a pair of guide surfaces, wherein each guide surface of the pair has a different inclination with respect to the center axis.

13. A washer nozzle device for a vehicle according to claim 10, wherein the injection port is partitioned in a first direction by the fluid guide and is partitioned in a second direction by the separator, wherein the first direction is perpendicular to the second direction.

14. A washer nozzle device in combination with a vehicle comprising:
- a body including a fluid path and a generally spherical socket, wherein the body is attached to the vehicle; and
- an adjustable nozzle including a flow passage and a generally spherical portion for engaging the socket, wherein a downstream end of the flow passage is located at an injection port, wherein the nozzle is attached to the body such that the flow passage communicates with the fluid path, wherein the nozzle includes a partition member located in the flow passage to divide a flow of fluid into a plurality of streams;
- wherein the partition member includes a fluid guide located in the center of the flow passage, the fluid guide having a dimension that increases in the downstream direction.

* * * * *